United States Patent
Miyamoto

(10) Patent No.: US 8,028,990 B2
(45) Date of Patent: Oct. 4, 2011

(54) PAPER THICKNESS DETECTING APPARATUS WITH APPLYING ELECTRODES

(75) Inventor: Akinori Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/690,456

(22) Filed: Jan. 20, 2010

(65) Prior Publication Data

US 2010/0117295 A1    May 13, 2010

Related U.S. Application Data

(63) Continuation of application No. PCT/JP2007/000799, filed on Jul. 26, 2007.

(51) Int. Cl.
*B65H 7/02* (2006.01)

(52) U.S. Cl. .............. 271/265.04; 324/663; 324/671; 324/672; 340/674; 340/675

(58) Field of Classification Search ............ 271/265.04, 271/262, 263; 324/663, 671–675, 682; 340/674, 340/675
See application file for complete search history.

(56) References Cited

U.S. PATENT DOCUMENTS

| 4,113,105 | A | * | 9/1978 | DeHart et al. ............... 209/549 |
| 5,035,415 | A | * | 7/1991 | Lee et al. .............. 271/265.03 |
| 5,076,566 | A | * | 12/1991 | Kriegel ................ 271/265.03 |
| 5,168,239 | A | * | 12/1992 | Winship .................... 324/671 |
| 5,198,777 | A |   | 3/1993 | Masuda et al. |

FOREIGN PATENT DOCUMENTS

| EP | 0 097 570 | 6/1983 |
| JP | 02-098605 | 4/1990 |
| JP | 7-52083 | 6/1995 |
| JP | 02-008702 | 1/1998 |
| JP | 2001-240271 | 9/2001 |
| JP | 2004-280367 | 10/2004 |

* cited by examiner

*Primary Examiner* — Gerald McClain
(74) *Attorney, Agent, or Firm* — Fujitsu Patent Center

(57) ABSTRACT

A paper thickness detecting apparatus includes a first sensor and a second sensor in which the electrostatic capacitance changes when a piece of paper such as a bank note or a piece of copying paper is inserted, and a thickness detecting unit for detecting the thickness of the piece of paper from the signals obtained from the respective first sensor and the second sensor, in order to provide a paper thickness detecting apparatus that can reliably detect a foreign object adhered to the paper.

5 Claims, 16 Drawing Sheets

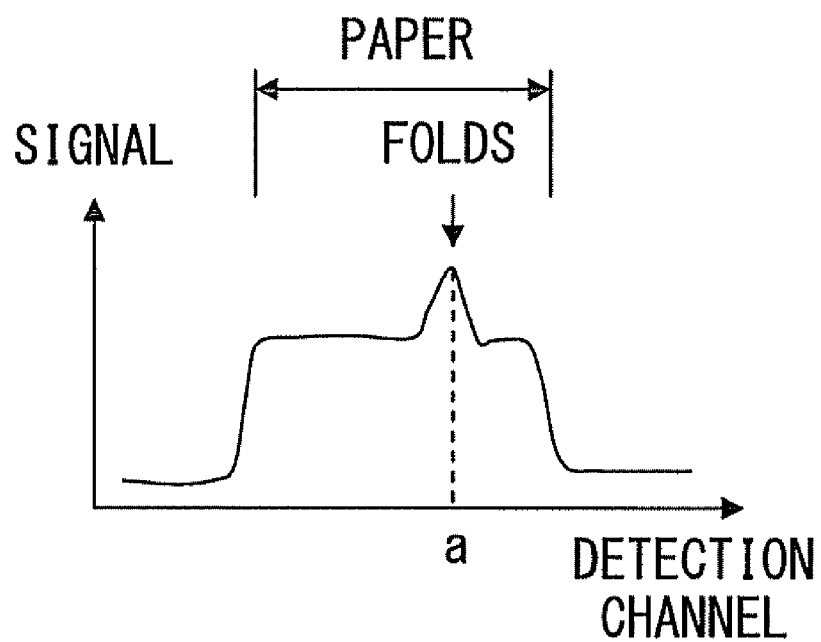
F I G. 2 A

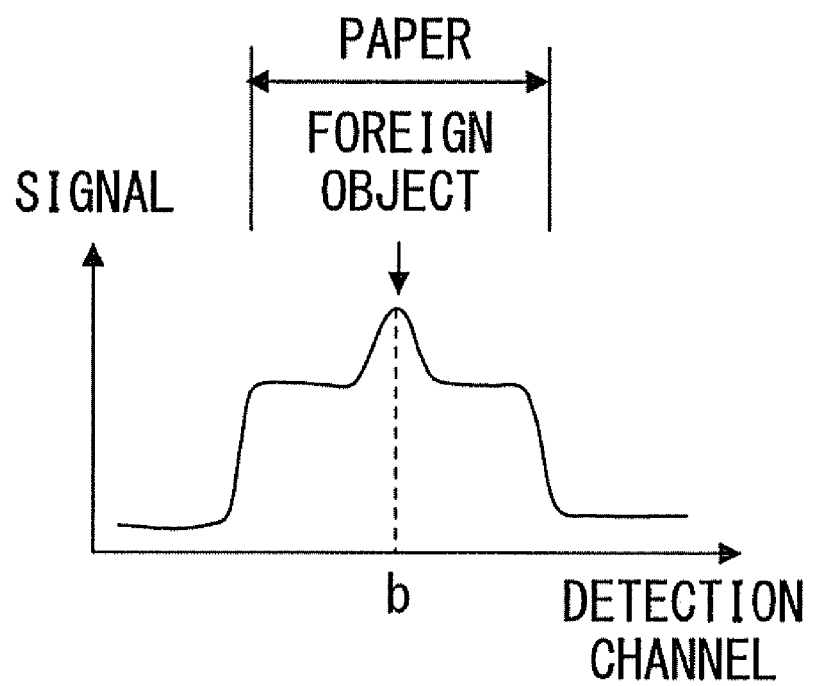
F I G. 2 B

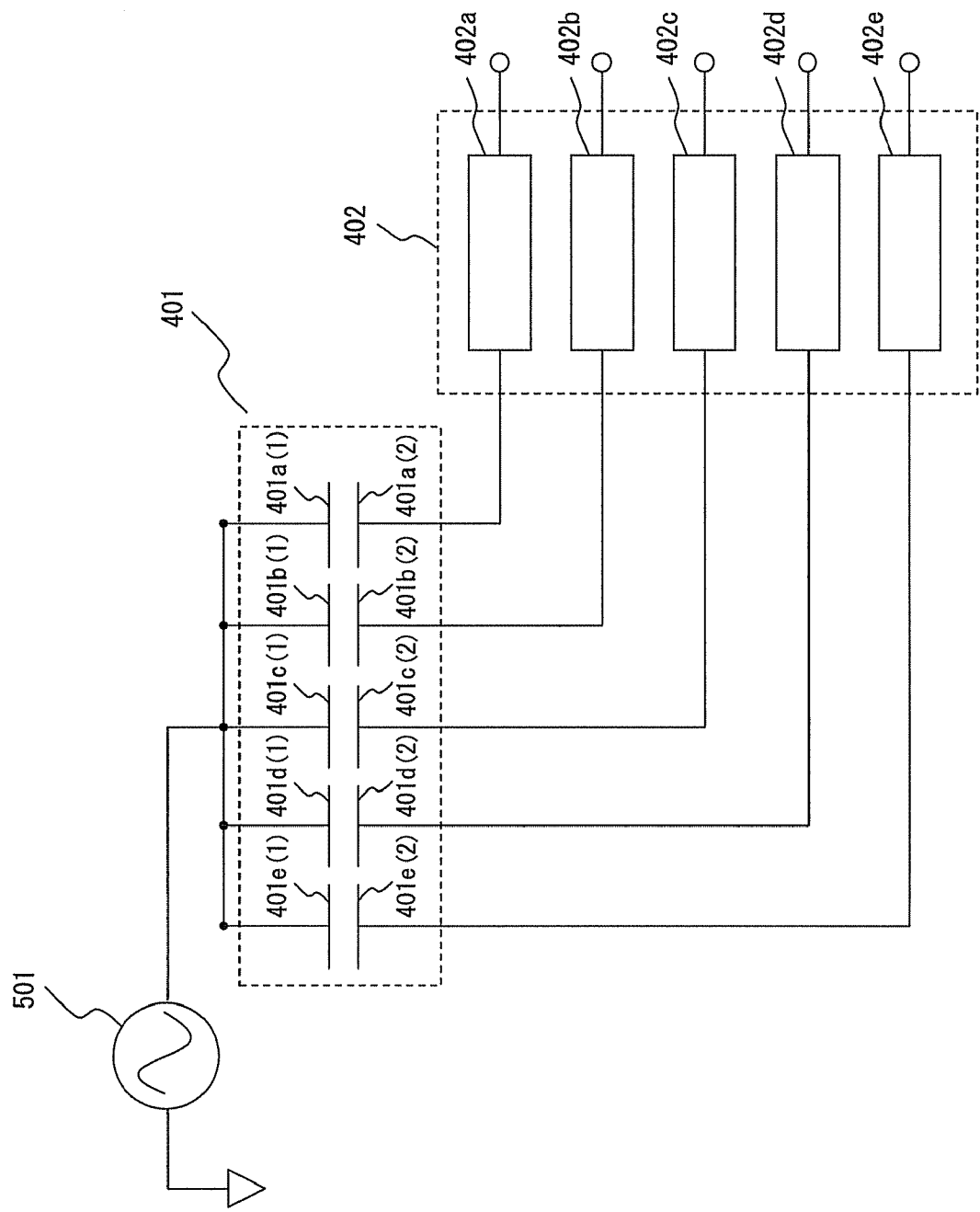
F I G. 5

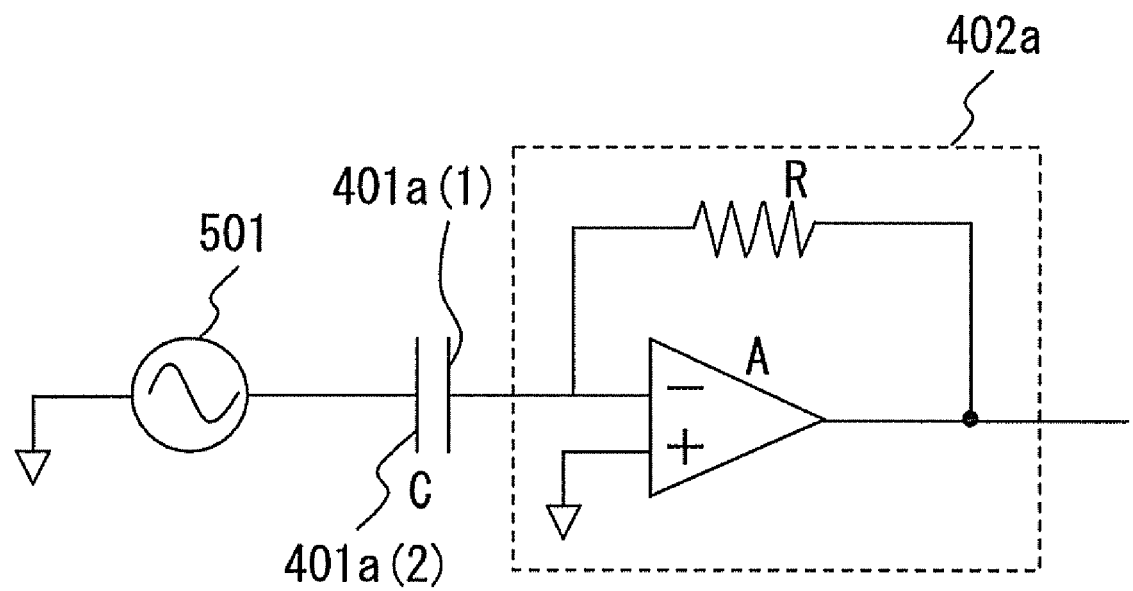
F I G. 6

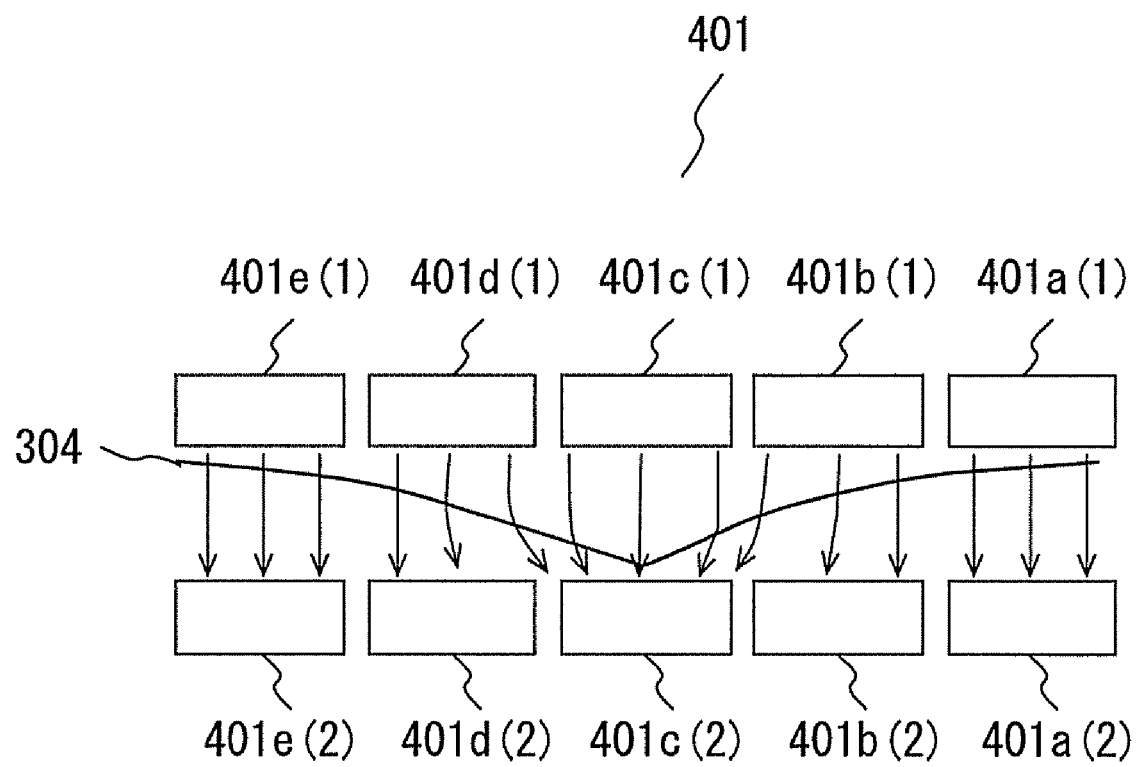
F I G. 7 A

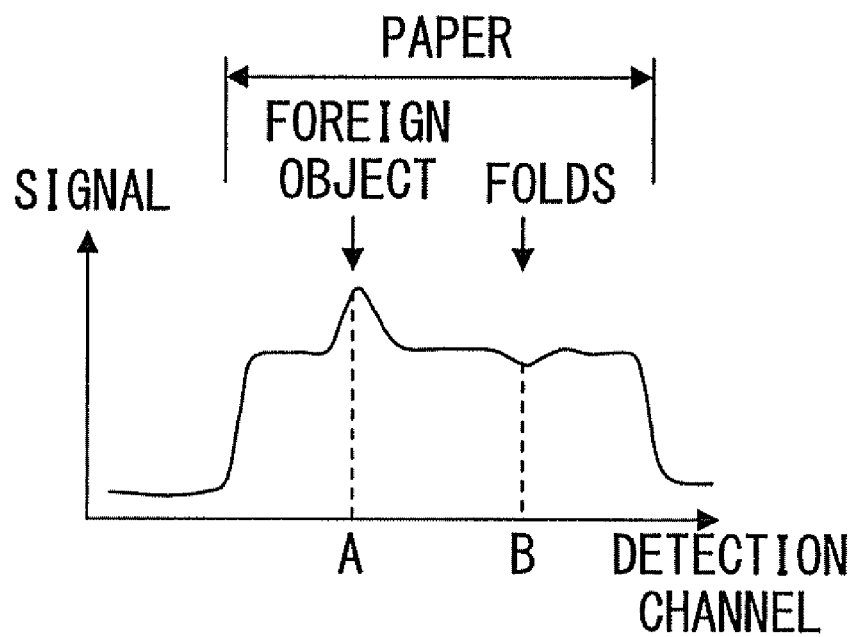
F I G. 8 B

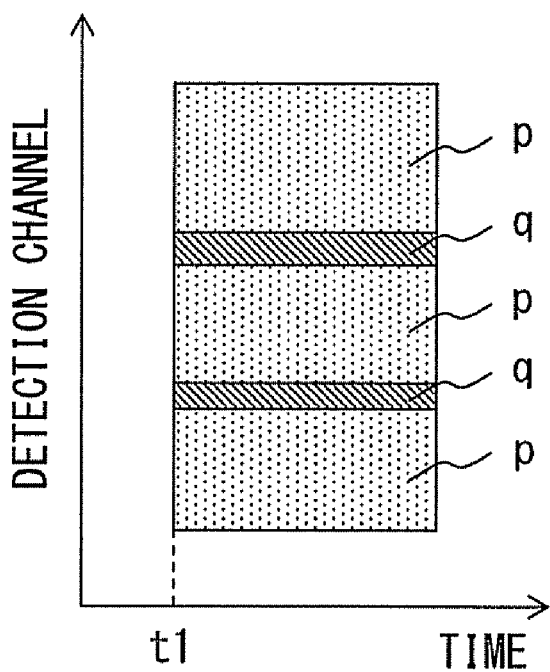
FIRST RESPONSE SIGNAL MAP
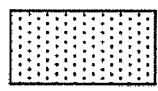 AREA IN WHICH SIGNALS ARE LARGER THAN FIRST THRESHOLD
 AREA IN WHICH SIGNALS ARE LARGER THAN SECOND THRESHOLD
F I G. 9 A

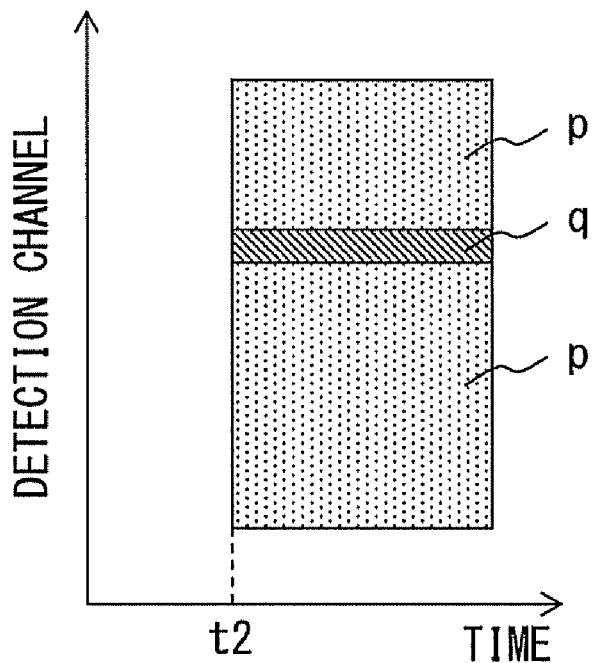
SECOND RESPONSE SIGNAL MAP
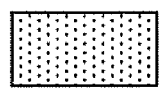 AREA IN WHICH SIGNALS ARE LARGER THAN FIRST THRESHOLD
 AREA IN WHICH SIGNALS ARE LARGER THAN SECOND THRESHOLD
F I G. 9B

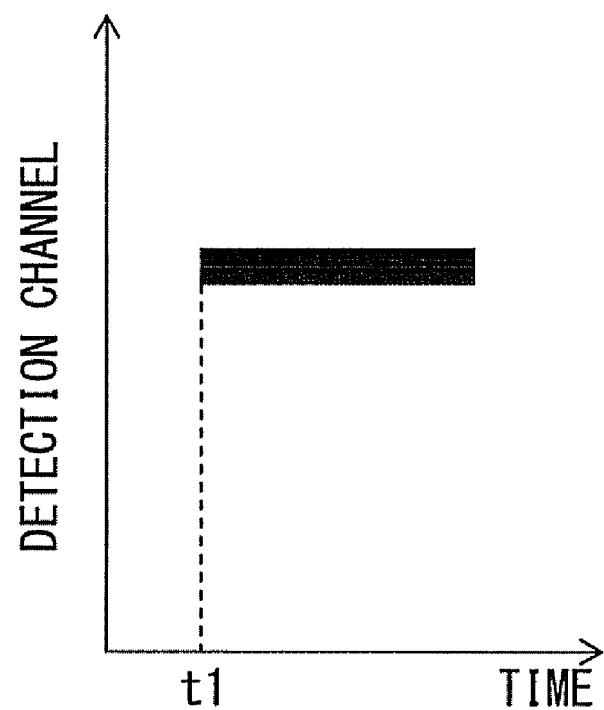
DETERMINATION RESULT MAP
 AREA IN WHICH SIGNALS EXCEEDED SECOND THRESHOLD IN BOTH MAPS
F I G. 9 C

PAPER THICKNESS DETECTING APPARATUS WITH APPLYING ELECTRODES

CROSS-REFERENCE TO RELATED APPLICATION

This application is a continuation of International Application No. PCT/JP2007/000799, which was filed on Jul. 26, 2007, the disclosure of which is incorporated herein by reference.

FIELD

The present invention relates to an apparatus for measuring the thickness of pieces of paper such as bank notes.

BACKGROUND

Automatic Teller Machines (ATMs) are provided with several types of sensors in order to perform various kinds of measurements against the inserted bank notes, thereby distinguishing the type of notes or checking for fake notes.

One of the measurements performed against the inserted bank notes by the ATM is to measure the thickness of the bank notes. By measuring the thickness, an overlapping of two or more bank notes due to an abnormal conveyance can be detected, or whether or not the bank notes are normal bank notes can be determined. Moreover, the existence of a foreign object on the paper can be checked by detecting the local distribution of the thickness.

Generally, methods of holding the paper by pressurizing it with two rollers and measuring the gap between the rollers are well-known as methods of measuring the thickness of pieces of paper. The thickness of pieces of paper can reliably be measured by using this method, but paper jamming is easily caused when the measurement is performed with pieces of paper being fed at a high speed, which is a problem.

In response to that problem, electrostatic capacitance thickness detecting methods that can measure the thickness without mechanically pressurizing the paper are becoming widespread. These electrostatic capacitance thickness detecting methods are for detecting the thickness of pieces of paper by using the change in electrostatic capacitance between the counter electrodes when the pieces of paper are inserted between the opposing electrodes. Although the change in the electrostatic capacitance depends on the thickness of the pieces of paper and the size of the relative permittivity in these methods, the thickness of the pieces of paper can be known from the change in the electrostatic capacitance as the size of the relative permittivity of the pieces of paper to be measured is constant.

A paper thickness detecting apparatus 100 of FIG. 1 is a general electrostatic capacitance paper thickness detecting apparatus. The paper thickness detecting apparatus 100 is provided with an electrostatic capacitance sensor (hereinafter, this sensor is referred to as "sensor array") 101 comprised of counter electrodes 101a-101e, and a thickness detector 102 for detecting the thickness of a piece of paper from response signals in response to signals input into the sensor array 101 (, the input signals are common for each of the counter electrodes 101a-101e).

Each of the counter electrodes 101a-101e constitutes a capacitor with a predetermined electrostatic capacitance. The thickness detector 102 receives response signals in response to common input signals (for example, sinusoidal signals) that are input to the counter electrodes 101a-101e. Then, the thickness of a piece of paper 103 is detected from those response signals. The common input signals to be provided to the sensor array 101 are input from a signal source (not illustrated) to the sensor array 101.

When the paper 103 is conveyed in a conveyance direction X and is inserted between the electrodes of the respective counter electrodes 101a-101e, the electrostatic capacitance of the counter electrodes 101a-101e changes, as described above. At this time, the response signals change as illustrated in FIG. 2A and FIG. 2B.

FIG. 2A and FIG. 2B are diagrams illustrating exemplary response signals when the paper 103 is inserted between the electrodes of the respective counter electrodes 101a-101e. The horizontal axis of FIG. 2A and FIG. 2B represents the counter electrodes 101a, 101b, ..., and 101e (hereinafter, they are referred to as "detection channel" as a whole), and the vertical axis represents the signal (electric current) detected by the detection channel.

As illustrated in FIG. 2A, when the paper 103 is inserted between the electrodes of the counter electrodes 101a-101e, the signal of the counter electrode at which there is a fold on the paper increases sharply (for example, "a" illustrated in FIG. 2A).

However, the electrostatic capacitance of the counter electrodes 101a-101e also changes when a foreign object is adhered to the paper, and thereby similar response signals as in FIG. 2A are obtained, as illustrated in "b" of FIG. 2B.

As described in the above, there has been a problem in which it is difficult to detect only a foreign object adhered to the paper as it is not possible to determine whether the change in the response signals is caused by folds in the paper or by a foreign object such as a piece of tape adhered to the paper.

In relation to the above-mentioned technique, Patent Document 1 discloses a paper thickness abnormality detection apparatus capable of detecting a thickness abnormality even when pieces of paper are fed at a high speed by performing a thickness abnormality detection with a detector having two or more condensers, and of speedily and accurately performing a detecting operation.

Patent Document 2 discloses a paper discrimination apparatus capable of reforming the nonuniform electric field between electrodes by rounding or chamfering the end face of the electrodes on the sides where pieces of paper are conveyed and by covering the electrodes with dielectric material, and of reducing the change in electrostatic capacitance between the electrodes due to the up-down fluctuation of the paper when the paper is conveyed between the electrodes.

Patent Document 3 discloses a paper discrimination sensor for discriminating the state of pieces of paper conveyed through a conveyance path by using the change in electrostatic capacitance between the counter electrodes arranged in the conveyance path of the paper, where a piece of tape or a seal can accurately and reliably be discriminated by forming the sensor body with the electrodes embedded onto the dielectric material and by providing a layer of conductive material whose surface resistance value is 104-109Ω on the surface of the sensor body on the sides where the paper pass through.

Patent Document 1: Japanese Patent Application No. H 02-098605
Patent Document 2: Japanese Patent Application No. 2001-240271
Patent Document 3: Japanese Patent Application No. 2004-280367

SUMMARY

The present invention has been made in view of the above-mentioned problems, and an object of the present invention is to provide a paper thickness detecting apparatus capable of reliably detecting a foreign object adhered to a piece of paper.

In order to solve the above-mentioned problems, the paper thickness detecting apparatus is provided with a first sensor including a first applying electrode and a first detecting electrode that are opposed to each other, the first sensor being coupled to an electric current detection circuit for detecting electric current in the first detecting electrode; a second sensor including a second applying electrode and a second detecting electrode that are opposed to each other, the second sensor being coupled to an electric current detection circuit for detecting electric current in the second detecting electrode, the first applying electrode and the second applying electrode being arranged on opposite sides of the conveyance path; and a thickness detecting unit configured to obtain a first response signal detected by the electric current detection circuit of the first sensor and a second response signal detected by the electric current detection circuit of the second sensor, and to detect a change in the thickness of the paper due to a foreign object from a result of comparing the first response signal with the second response signal.

According to the present invention, the thickness detecting unit obtains a first response signal from the first sensor and a second response signal from the second sensor. Then, the first response signal is compared with the second response signal.

Here, the first sensor and the second sensor are arranged such that the first applying electrode and the second applying electrode are placed on opposites side of the conveyance path, and thus the directions of the electric lines of force against the paper conveyed through the sensors are not the same. Accordingly, the first response signals and the second response signals will be different signals when there are folds on the paper.

Therefore, there will be an advantageous effect in which the folds on the paper and a foreign object adhered to the paper can be distinguished from each other by comparing the first response signal with the second response signal.

As described in the above, according to the present invention, a paper thickness detecting apparatus that can reliably detect a foreign object adhered to the paper can be provided.

BRIEF DESCRIPTION OF DRAWINGS

FIG. 2A is a diagram illustrating exemplary response signals when a piece of paper is inserted between the electrodes of respective counter electrodes of FIG. 1.

FIG. 2B is a diagram illustrating exemplary response signals when a piece of paper is inserted between the electrodes of respective counter electrodes of FIG. 1.

FIG. 5 is a diagram illustrating an exemplary specific configuration of a first sensor array according to an embodiment of the present invention.

FIG. 6 is a diagram illustrating a specific configuration of electric current detection circuits included in a first sensor array according to an embodiment of the present invention.

FIG. 7A is a diagram illustrating the change in electrostatic capacitance in a first sensor array according to an embodiment of the present invention.

FIG. 8B is a diagram illustrating exemplary second response signals according to an embodiment of the present invention.

FIG. 9A is a diagram illustrating an exemplary map of first response signals according to an embodiment of the present invention.

FIG. 9B is a diagram illustrating an exemplary map of second response signals according to an embodiment of the present invention.

FIG. 9C is a diagram illustrating an exemplary determination result map according to an embodiment of the present invention.

DESCRIPTION OF EMBODIMENTS

Some embodiments will be described with reference to FIG. 3-FIG. 11.

Figure 1:
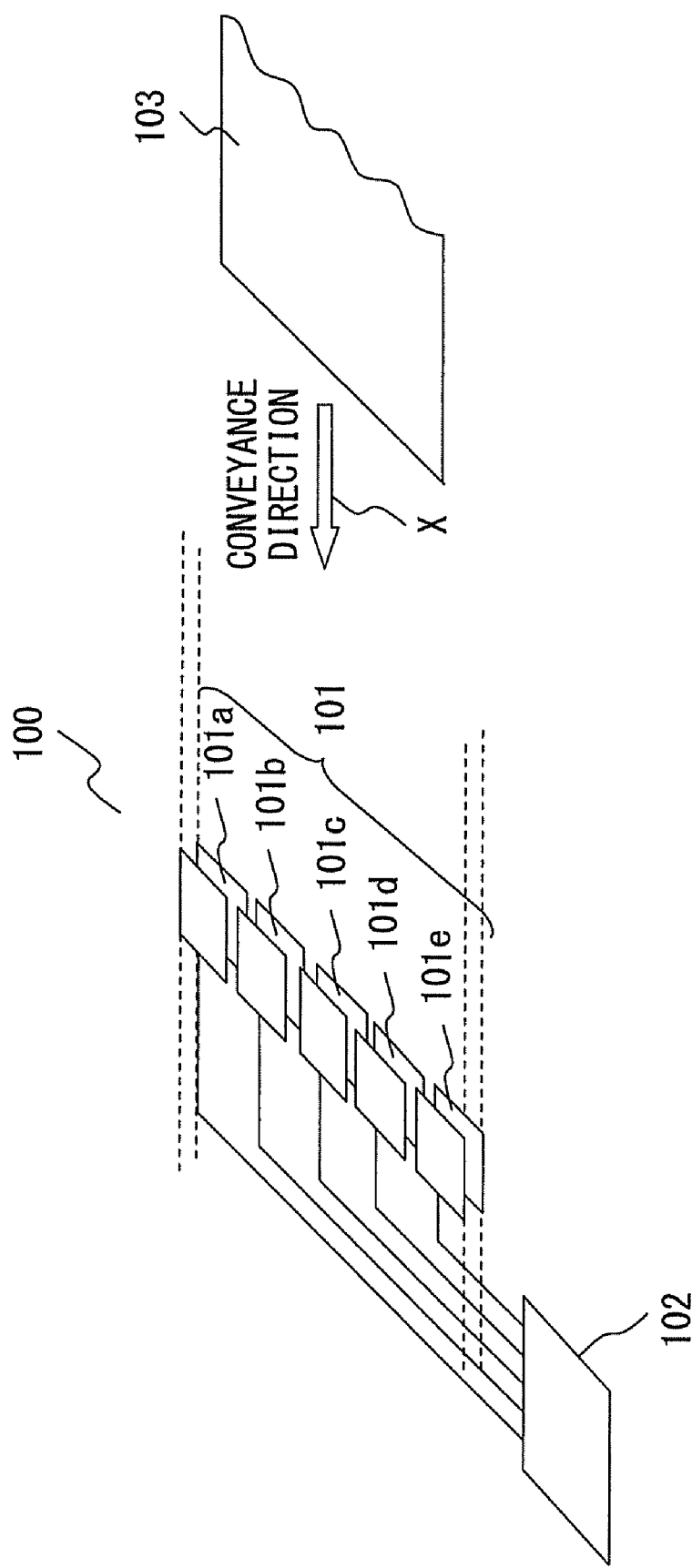
FIG. 1 is a diagram illustrating an exemplary conventional electrostatic capacitance paper thickness detecting apparatus.
Figure 3:
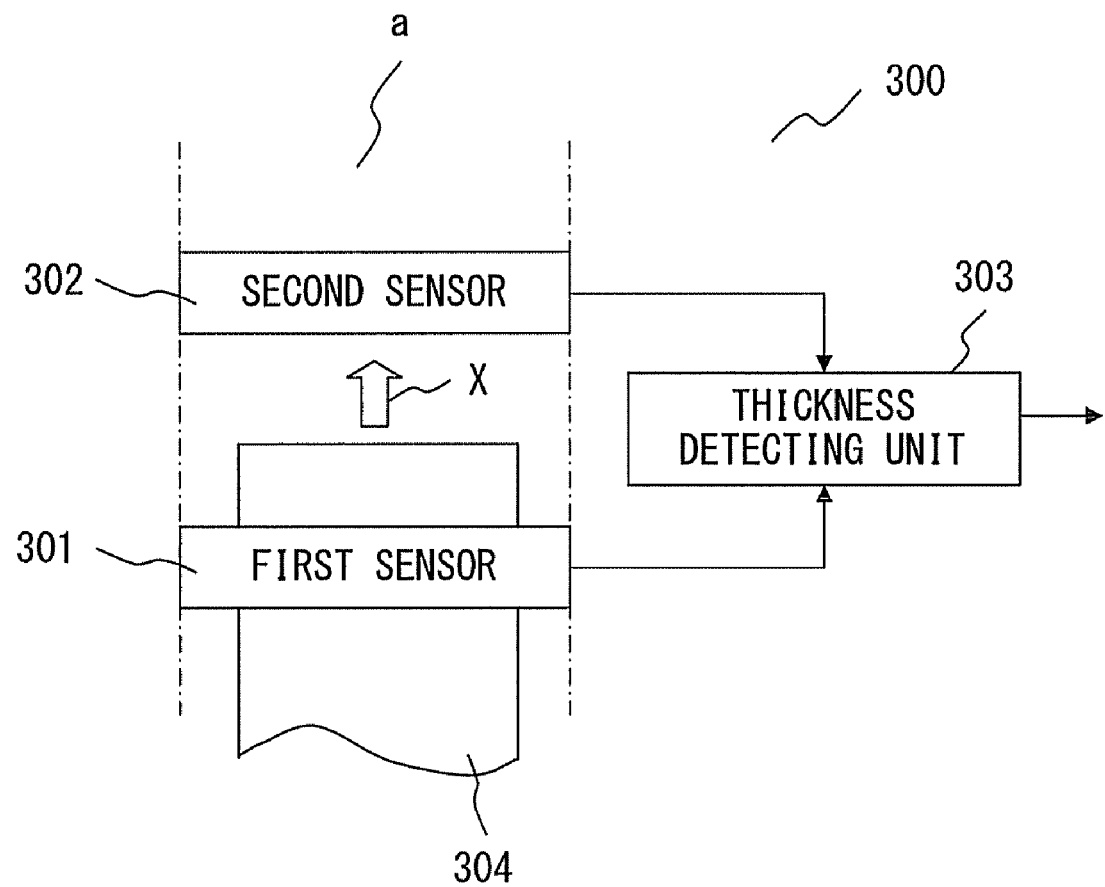
FIG. 3 is a diagram illustrating the operational principle of a paper thickness detecting apparatus according to an embodiment of the present invention.

FIG. 3 is a diagram illustrating the operational principle of a paper thickness detecting apparatus according to an embodiment of the present invention.

Figure 8A:
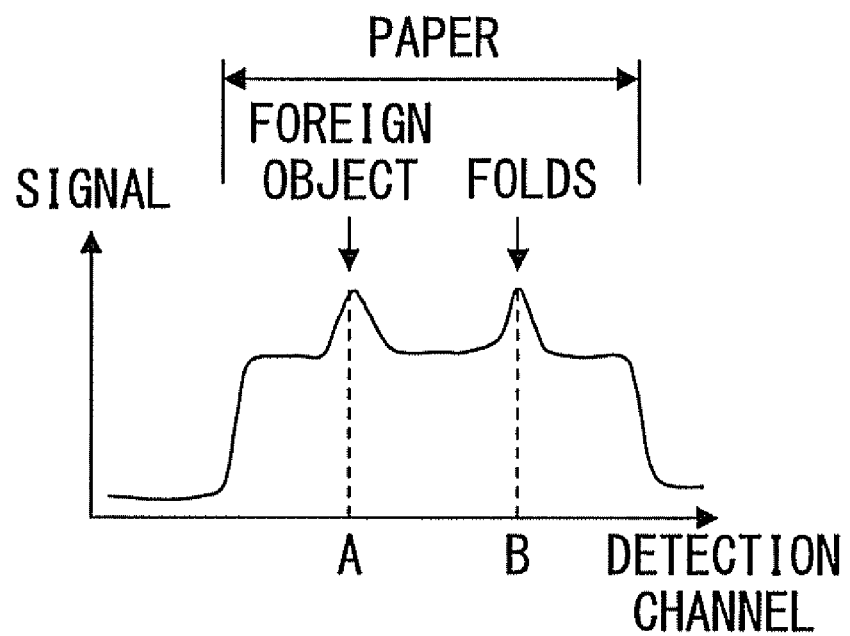
FIG. 8A is a diagram illustrating exemplary first response signals according to an embodiment of the present invention.

A paper thickness detecting apparatus 300 of FIG. 3 includes a first sensor 301 and a second sensor 302 in which the electrostatic capacitance changes when a piece of paper 304 such as a bank note or a piece of copying paper is inserted, and a thickness detecting unit 303 for detecting the thickness of the piece of paper 304 from the signals respectively obtained from the first sensor 301 and the second sensor 302 (For example, a signal illustrated in FIG. 8A or FIG. 8B. Hereinafter, these signals are referred to as ("response signals").

The first sensor 301 is constituted by two or more electrostatic capacitance sensors comprised of first applying electrodes and first detecting electrodes (hereinafter, these electrostatic capacitance sensors are referred to as "sensors"). The first applying electrode may be constituted by a single common electrode.

The sensors of the first sensor 301 include an electric current detection circuit for detecting the electric current in the first detecting electrodes. Hereinafter, the signals that are detected by the electric current detection circuits are referred to as "first response signals".

In the present embodiment, among the counter electrodes that constitute the sensors, the electrodes whose electric potential is oscillated by the signal source are defined as "applying electrodes". Then, the electrodes of the other side, i.e., the electrodes whose electric current is to be measured are defined as "detecting electrodes". The same applies to the following.

The second sensor 302 is constituted by two or more sensors that are comprised of second applying electrodes and second detecting electrodes. In a similar way as for the first applying electrodes, the second applying electrode may also be configured by a single common electrode.

In a similar way as for the first sensor 301, the sensors of the second sensor 302 include an electric current detection circuit for detecting the electric current in the second detecting electrode. Hereinafter, the signals that are detected by this electric current detection circuit are referred to as "second response signals".

Then, the first sensor 301 and the second sensor 302 are arranged such that a conveyance path a of the piece of paper 304 passes between the electrodes. Moreover, the first applying electrodes of the first sensor 301 and the second applying electrodes of the second sensor 302 are arranged such that they are placed on opposite sides of the conveyance path a.

Accordingly, as the piece of paper 304 is conveyed along the conveying path a in an X direction, the piece of paper 304 firstly passes between the electrodes of the first sensor 301, and then passes between the electrodes of the second sensor 302.

The thickness detecting unit 303 obtains the first response signals and the second response signals respectively from the first sensor 301 and the second sensor 302. Then, the first response signals and the second response signals are compared with each other, and it is determined whether the change in the thickness of the paper is due to a foreign object such as an adhered piece of tape or due to folds.

For example, the thickness detecting unit 303 extracts signals at a predetermined level from the first response signals. In a similar manner, the thickness detecting unit 303 detects signals at a predetermined level from the second response signals. Then, the extracted signals are compared with each other. When the extracted signals match each other, it is determined that the extracted signals are due to a foreign object such as an adhered piece of tape (when the signals do not match each other, it is determined that the extracted signals are due to folds).

Furthermore, a signal source (not illustrated) is coupled to the sensors of the first sensor 301 and the sensors of the second sensor 302, and provides a signal to the sensors. The input signal is common for the sensors of the sensor 301, and is also common for the sensors of the second sensor 302 respectively.

Figure 4:
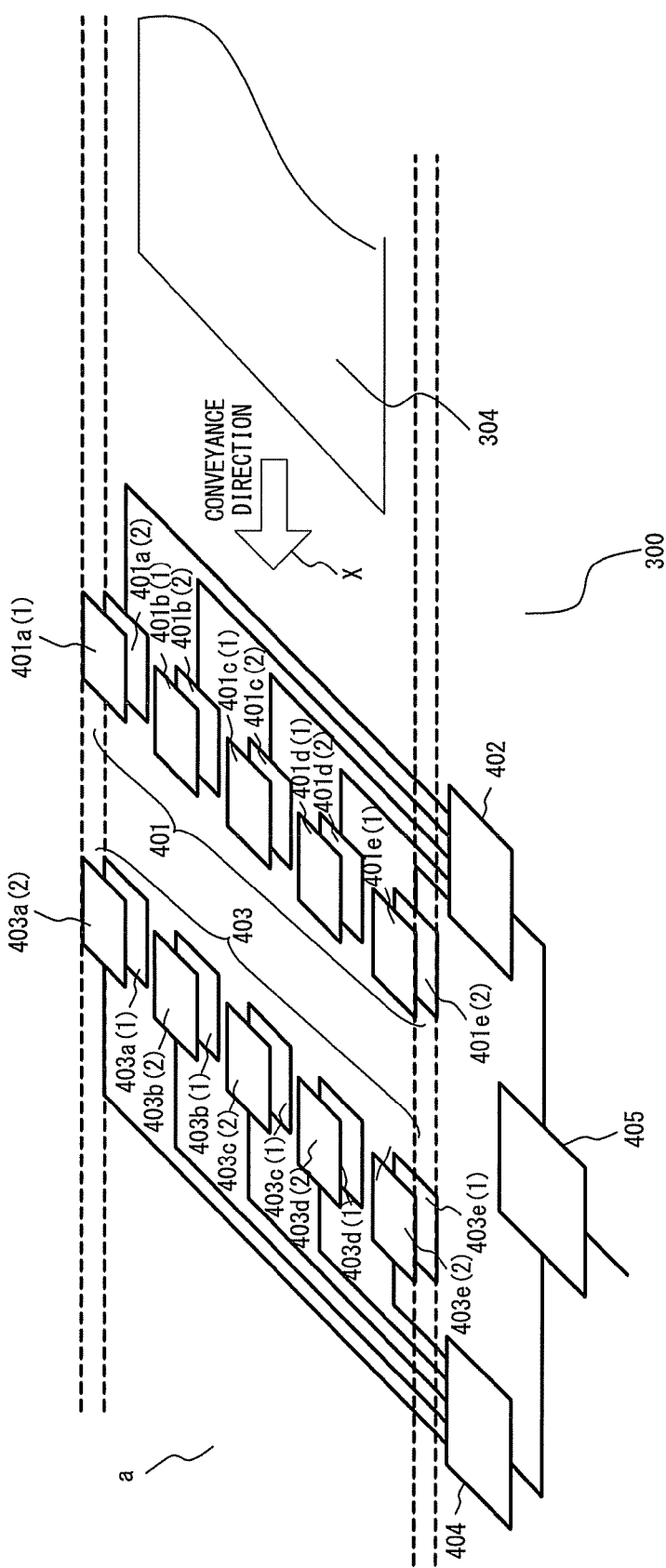
FIG. 4 is a diagram illustrating an exemplary specific configuration of a paper thickness detecting apparatus according to an embodiment of the present invention.

FIG. 4 is a diagram illustrating an exemplary specific configuration of a paper thickness detecting apparatus 300 according to the embodiments of the present invention. As illustrated in FIG. 4, the paper thickness detecting apparatus 300 includes a first sensor array 401 for detecting the change in electrostatic capacitance, a first electric current detection circuit 402 for detecting first response signals, a second sensor array 403 for detecting the change in electrostatic capacitance, a second electric current detection circuit 404 for detecting second response signals, and a thickness detecting unit 405 for detecting the thickness of the piece of paper 304 from the first and second response signals.

The first sensor array 401 includes first applying electrodes 401a(1), 401b(1), . . . , and 401e(1), and first detecting electrodes 401a(2), 401b(2), . . . , and 401e(2).

Hereinafter, the first applying electrodes 401a(1), 401b(1), . . . , and 401e(1) are collectively referred to as "first applying electrodes", and the first detecting electrodes 401a(2), 401b(2), . . . , and 401e(2) are collectively referred to as "first detecting electrodes".

The first applying electrode 401a(1) and the first detecting electrode 401a(2), the first applying electrode 401b(1) and the first detecting electrode 401b(2), . . . , and the first applying electrode 401e(1) and the first detecting electrode 401e(2) are sensors, each of which constitutes a capacitor and is provided with a predetermined electrostatic capacitance.

The first electric current detection circuit 402 is coupled to the first detecting electrodes to detect the electric current of the electrodes. In other words, the first electric current detection circuit 402 obtains the first response signals from the first sensor array 401. Then, the first electric current detection circuit 402 notifies the thickness detecting unit 405 of the obtained first response signals.

The second sensor array 403 includes second applying electrodes 403a(1), 403b(1), . . . , and 403e(1), and second detecting electrodes 403a(2), 403b(2), . . . , and 403e(2).

Hereinafter, the second applying electrode 403a(1), 403b(1), . . . , and 403e(1) are collectively referred to as "second applying electrodes", and the second detecting electrode 403a(2), 403b(2), . . . , and 403e(2) are collectively referred to as "second detecting electrodes".

Then, the second applying electrode 403a(1) and the second detecting electrode 403a(2), the second applying electrode 403b(1) and the second detecting electrode 403b(2), . . . , and the second applying electrode 403e(1) and the second detecting electrode 403e(2) are sensors, each of which constitutes a capacitor and is provided with a predetermined electrostatic capacitance.

The second electric current detection circuit 404 is coupled to the second detecting electrodes to detect the electric current of the electrodes. In other words, the second electric current detection circuit 404 obtains the second response signals from the second sensor array 403. Then, the second electric current detection circuit 404 notifies the thickness detecting unit 405 of the obtained second response signals.

The first sensor array 401 and the second sensor array 403 are arranged such that the conveyance path a of the piece of paper 304 passes between the electrodes.

Also, the first sensor array 401 and the second sensor array 403 are arranged such that the first applying electrodes are arranged above the conveyance path a while the second applying electrodes are arranged below the conveyance path a.

In other words, the first sensor array 401 and the second sensor array 403 are arranged such that the first applying electrodes of the first sensor array 401 and the second applying electrodes of the second sensor array 403 are placed on opposite sides of the conveyance path a.

As described in the above, the thickness detecting unit 405 obtains the first response signals and the second response signals respectively from the first electric current detection circuit 402 and the second electric current detection circuit 404. Then, signals at a level higher than a predetermined level are extracted from the first response signals and the second response signals, and the extracted signals are compared with each other. When the extracted signals match each other, it is determined that a foreign object such as a piece of tape is adhered to the piece of paper 304 (when the signals do not match each other, it is determined that there are folds on the piece of paper 304).

For the purpose of simplification it is not illustrated, but a signal source that provides an input signal such as a sinusoidal signal is coupled to the first applying electrodes of the first sensor array 401 and the second applying electrodes of the second sensor array 403.

The piece of paper 304 is conveyed in the conveyance path a in a conveyance direction X. As the piece of paper 304 can be conveyed by using the related art such as of holding and carrying the piece of paper 304 to the conveyance path by using two rollers, its details will be omitted. The piece of paper 304 that is conveyed through the conveyance path a passes between the electrodes of the first sensor array 401. Then, the piece of paper 304 is conveyed between the electrodes of the second sensor array 403.

In the above-described configuration, the first sensor 301 of FIG. 3 corresponds to the first sensor array 401 and the first electric current detection circuit 402. Moreover, the second sensor 302 corresponds to the second sensor array 403 and the second electric current detection circuit 404. Furthermore, the thickness detecting unit 303 corresponds to the thickness detecting unit 405.

For the purpose of simplification, the first and second sensor arrays having five applying electrodes and five detecting electrodes are described in the above, but it should be understood that the number of the applying electrodes and the detecting electrodes are not to be limited.

FIG. 5 is a diagram illustrating an exemplary specific configuration of the first sensor array 401 according to the embodiment of the present invention.

As illustrated in FIG. 5, in the first sensor array 401, the first applying electrode 401a(1) and the first detecting electrode 401a(2), the first applying electrode 401b(1) and the first detecting electrode 401b(2), . . . , and the first applying electrode 401e(1) and the first detecting electrode 401e(2) respectively constitute a capacitor.

A signal source 501 is coupled to the respective first applying electrodes 401a(1), 401b(1), . . . , and 401e(1), and provides a sinusoidal signal or the like.

The first detecting electrodes 401a(2), 401b(2), . . . , and 401e(2) are respectively coupled to electric current detection circuits 402a, 402b, . . . , and 402e that constitute the first electric current detection circuit 402. The signals that are detected at the respective electric current detection circuits 402a, 402b, . . . , and 402e are transmitted to the thickness detecting unit 405.

In FIG. 5, the exemplary specific configuration of only the first sensor array 401 is described, but the second sensor array 403 is configured in a similar manner.

FIG. 6 is a diagram illustrating a specific configuration of the electric current detection circuit 402a-402e included in the first sensor array 401 according to the embodiment of the present invention. FIG. 6 illustrates an exemplary configuration of only the electric current detection circuit 402a, but the other electric current detection circuits 402b-402e are also configured in a similar manner.

As illustrated in FIG. 6, the detection circuit 402a is an electric current voltage conversion circuit which includes a resistance R and an operational amplifier A, and is coupled to a capacitor C comprised of a first applying electrode 401a(1) and a first detecting electrode 401a(2) at an input. This configuration may be referred to as a self-balancing bridge circuit.

It is to be noted that the detection circuit 402a is not limited to the circuit illustrated in FIG. 6. For example, the detection circuit 402 may be configured in a different manner as long as it is capable of obtaining the first response signals by measuring the electric current in the first detecting electrode 401a(2).

Figure 7B:
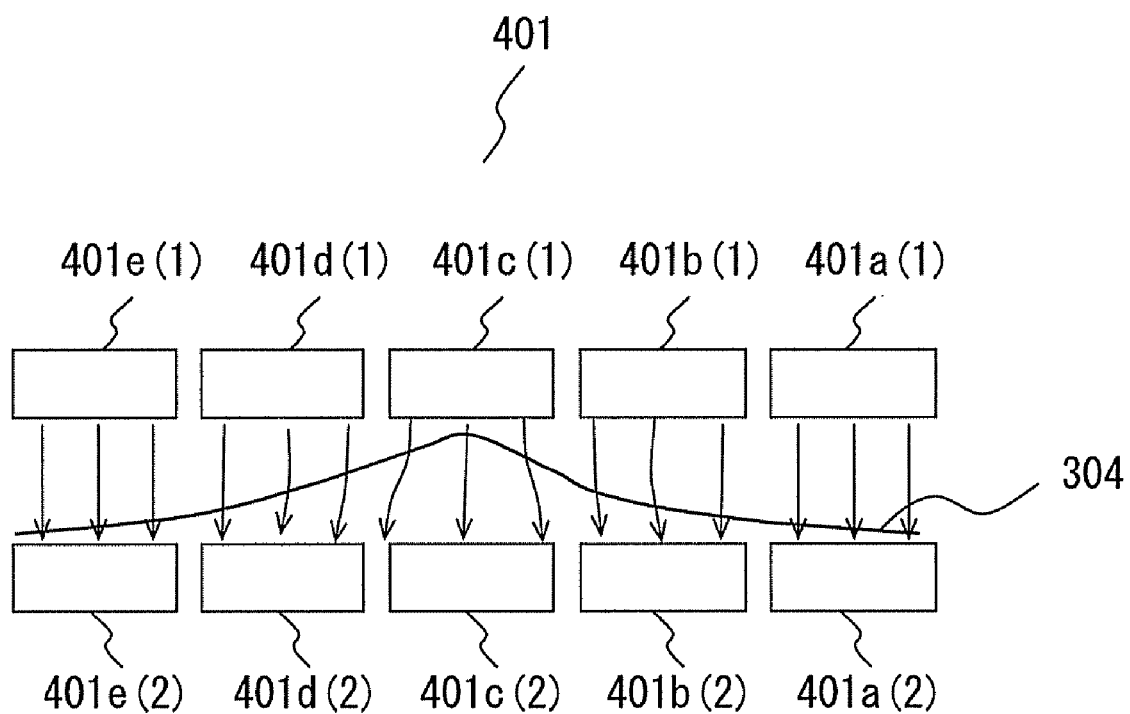
FIG. 7B is a diagram illustrating the change in electrostatic capacitance in a first sensor array according to an embodiment of the present invention.

Here, the change in electrostatic capacitance when the piece of paper 304 having a fold is inserted into the first sensor array 401 will be described with reference to FIG. 7A and FIG. 7B. FIG. 7A and FIG. 7B are diagrams illustrating cross-sectional view of the first sensor array 401, which represent the vertical surface to the conveyance direction x.

FIG. 7A schematically illustrates the electric lines of force of the first sensor array 401 when the convex portion of the fold of the piece of paper 304 is at the first detecting electrode side. A phenomenon is caused in which the electric lines of force are gathered to the portion of the piece of paper 304 where the permittivity is larger than the air. Accordingly, when the convex portion of the fold is facing the first detecting electrode side, the electric lines of force from the first applying electrodes are gradually gathered to the convex portion, and are input into the first detecting electrodes just as gathered.

The electric current in the first detecting electrodes is determined by the charge amount induced on the first detecting electrodes, i.e., the number of the electric lines of force that are input into the first detecting electrodes (integration of electric field). In FIG. 7A, the electric lines of force are gathered to the vicinity of the convex portion, and thereby the electric current of the first detecting electrode 401c(2) around the convex portion becomes larger. Accordingly, for example, a response signal B of FIG. 8A is obtained.

On the other hand, FIG. 7B schematically illustrates the electric lines of force of the first sensor array 401 when the convex portion of the fold of the piece of paper 304 is at the first applying electrode side. As described in the above, a phenomenon is caused in which the electric lines of force are gathered to the portion of the piece of paper 304 where the permittivity is larger than the air, and thus the electric lines of force from the first applying electrodes are dispersed from the top of the fold towards the edges of the paper away from the fold and input into the first detecting electrodes. Accordingly, the electric lines of force around the convex portion are dispersed, and thereby the electric current of the first detecting electrode 401c(2) around the convex portion becomes smaller. Accordingly, for example, a response signal B of FIG. 8B is obtained.

Here, if a piece of tape is adhered to the piece of paper 304, it means that a substance whose relative permittivity is larger than 1 is adhered to the piece of paper 304. Accordingly, the electric current increases at the position to which the piece of tape is adhered regardless of whether the piece of tape is adhered to the surface of the first applying electrode side or the surface of the first detecting electrode side. Accordingly, for example, a response signal A of FIG. 8A or FIG. 8B is obtained.

FIG. 8A and FIG. 8B are diagrams illustrating exemplary first response signals that are detected by the first sensor array 401 and second response signals that are detected by the second sensor array 403, according to the embodiments of the present invention. As the horizontal axis of the graph representing detection channels, the graph should actually be a discrete graph on which the electric current for each detection channel is plotted. However, for the purpose of simplification, it is illustrated with a continuous solid line.

The response signals illustrated in FIG. 8A and FIG. 8B indicate the response signals of when the piece of paper 304 having a convex portion of the fold and a foreign object such as a piece of tape on the first detecting electrode side is inserted through the first sensor array 401 and the second sensor array 403.

FIG. 8A illustrates the first response signals. As the foreign object such as a piece of tape is adhered to the paper, the electric current of the first detecting electrodes at the positions of the piece of tape is increased, and thereby a response signal A is obtained. In the first sensor array 401, the convex portion of the fold of the piece of paper 304 is at the first detecting electrode side, and thus the state becomes like FIG. 7A. Accordingly, the electric current of the first detecting electrodes around the convex portion increases, and thereby a response signal B is obtained.

FIG. 8B illustrates the second response signals. As the foreign object such as a piece of tape is adhered to the paper, the electric current of the second detecting electrodes at the positions of the piece of tape is increased, and thereby a response signal A is obtained. In the second sensor array 403, the convex portion of the fold of the piece of paper 304 is at the second applying electrode side, and thus the state becomes like FIG. 7B. Accordingly, the electric current of the second detecting electrodes around the convex portion decreases, and thereby a response signal B is obtained.

In the thickness detecting apparatus 300 according to the present embodiment, the thickness detecting unit 405 stores response signals of when the paper 304 is conveyed through the first sensor array 401 and the second sensor array 403. Then, the thickness detecting apparatus 300 generates a map of the first response signals (map illustrated in FIG. 9A) and a map of the second response signals (map illustrated in FIG. 9B), and generates a determination result map from the two generated maps to detect a foreign object. The specific processing of the thickness detecting unit 405 is listed below.

(1) First and second response signals are begun to be obtained.

(2) A first response signal is obtained. The time at which the first response signal is obtained for the first time is defined as t1.

(3) The first response signal is compared with a signal level that corresponds to the thickness of the piece of paper 304 (hereinafter, this signal level is referred to as a "first threshold"), and thereby a signal of the piece of paper 304 is extracted. Then, the extracted signal is stored in a storage unit or the like (not illustrated).

(4) The extracted signal in process (3) is compared with a signal level corresponding to folds or a foreign object (hereinafter, they are referred to as "folds or the like") on the piece of paper 304 (hereinafter, this signal level is referred to as a "second threshold"), and thereby a signal of the portion of folds or the like of the piece of paper 304 is extracted. Then, the extracted signal is stored in a storage unit or the like. In the present embodiment, a signal level of 1.5 times the first threshold is used as the second threshold.

(5) A second response signal is obtained. The time at which the second response signal is obtained for the first time is defined as t2.

(6) The second signal is compared with the first threshold, and thereby a signal of the piece of paper 304 is extracted. Then, the extracted signal is stored in a storage unit or the like.

(7) The signal extracted in process (6) is compared with the second threshold, and thereby a signal of the portion of folds or the like of the piece of paper 304 is extracted. Then, the extracted signal is stored in a storage unit or the like.

(8) Processes (2)-(4) are repeated while the first response signals are being detected, and processes (5)-(7) are repeated while the second response signals are being detected.

By performing the above processing, the map of the first response signals (hereinafter, this map is referred to as a "first response signal map") illustrated in FIG. 9A and the map of the second response signals (hereinafter, this map is referred to as a "second response signal map") illustrated in FIG. 9B are generated.

In FIG. 9A and FIG. 9B, dotted area p represents signals larger than the first threshold, and diagonally shaded area q represent signals larger than the second threshold. Accordingly, the diagonally shaded area q indicates an area in which the thickness has changed due to folds or a foreign object such as a piece of tape on the piece of paper 304.

(9) Once processes (2)-(7) are completed, the first response signal map and the second response signal map are compared with each other. Then, signals that exceed the second threshold in both maps are extracted so as to generate a map (hereinafter, this map is referred to as a "determination result map").

The obtainment starting time t1 in the first response signal map and the obtainment starting time t2 in the second response signal map are different from each other, so the maps should be compared with each other upon adjusting the time of the second response signal map by t2-t1.

(10) The determination result map illustrated in FIG. 9C is obtained by processing (9). Then, black-painted area r in the map is determined to correspond to a foreign object such as a piece of tape adhered to the piece of paper 304.

In the above embodiment, the first sensor array 401 in which the first applying electrode 401a(1) and first detecting electrode 401a(2), the first applying electrode 401b(1) and first detecting electrode 401b(2), . . . , and the first applying electrode 401e(1) and the first detecting electrode 401e(2) respectively constitute a capacitor are described as an example, but as is apparent from the description of FIG. 7A and FIG. 7B, the first applying electrodes may be a single common electrode.

Similarly, the second sensor array 403 in which the second applying electrode 403a(1) and second detecting electrode 403a(2), the second applying electrode 403b(1) and second detecting electrode 403b(2), . . . , and the second applying electrode 403e(1) and second detecting electrode 403e(2) respectively constitute a capacitor are described as an example, but the second applying electrodes may be a single common electrode. Such exemplary configurations will be described.

Figure 10:
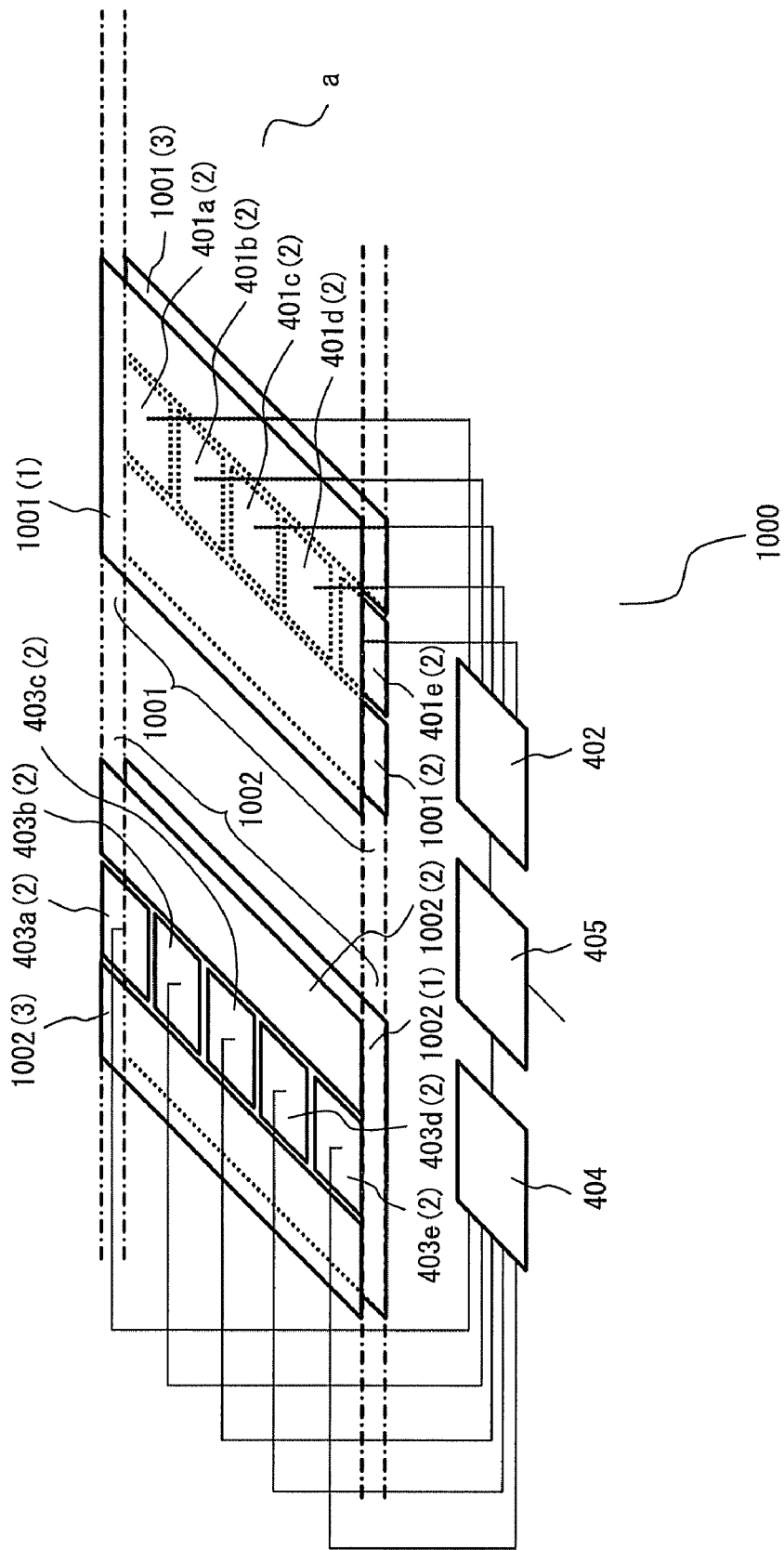
FIG. 10 is a diagram illustrating the first modification of a paper thickness detecting apparatus according to an embodiment of the present invention.

FIG. 10 is a diagram illustrating the first modification of the paper thickness detecting apparatus 300 according to the embodiments of the present invention.

A paper thickness detecting apparatus 1000 illustrated in FIG. 10 includes a first sensor 1001 and a second sensor 1002 for detecting the change in electrostatic capacitance, the first electric current detection circuit 402 for detecting first response signals, the second electric current detection circuit 404 for detecting the second response signals, and the thickness detecting unit 405 for detecting the thickness of the piece of paper 304 from the first and second response signals. It is to be noted that first guard electrodes 1001(2) and 1001(3) and second guard electrodes 1002(2) and 1002(3) are not essential elements.

The first sensor 1001 includes a first applying electrode 1001(1), first detecting electrodes 401a(2), 401b(2), . . . , and 401e(2), and first guard electrodes 1001(2) and 1001(3).

The first applying electrode 1001(1) is the common applying electrode for the first detecting electrodes 401a(2), 401b(2), . . . , and 401e(2), and for the first guard electrodes 1001(2) and 1001(3).

The size of the first applying electrode 1001(1) is equal to the sum of the sizes of the first detecting electrodes 401a(2), 401b(2), . . . , and 401e(2), and the sizes of the first guard electrodes 1001(2) and 1001(3). In the case of not using the first guard electrodes 1001(2) and 1001(3), the size of the first applying electrode 1001(1) may be equal to the sum of the sizes of the first detecting electrodes 401a(2), 401b(2), and 401e(2).

In this case, the first applying electrode 1001(1) and the first detecting electrodes 401a(2), 401b(2), . . . , and 401e(2) respectively constitute a capacitor, and are provided with predetermined electrostatic capacitance.

The first detecting electrodes 401a(2), 401b(2), . . . , and 401e(2) lie between the first guard electrode 1001(2) and the first guard electrode 1001(3). Moreover, the first guard electrode 1001(2) and the first guard electrode 1001(3) are coupled to the same electric potential as that of the first detecting electrodes (for example, 0V).

By having the first guard electrodes 1001(2) and 1001(3), the phenomenon in which the electric lines of force spread beyond the counter electrodes may be prevented from occurring. For example, if there is nothing between the electrodes, the electric lines of force are input from the first applying electrode 1001(1) vertically to the respective first detecting electrodes 401a(2), 401b(2), . . . , and 401e(2).

Accordingly, the electric lines of force can be prevented from spreading between the counter electrodes. Thus, response signals that do not depend on the position of the piece of paper 304 between the counter electrodes can be obtained.

The second sensor 1002 includes a second applying electrode 1002(1), second detecting electrodes 403a(2), 403b(2), . . . , and 403e(2), and first guard electrodes 1002(2) and 1002(3).

The second applying electrode 1002(1) is the common applying electrode for the second detecting electrodes 403a(2), 403b(2), . . . , and 403e(2), and for the second guard electrodes 1002(2) and 1002(3).

The size of the second applying electrode 1002(1) is equal to the sum of the sizes of the second detecting electrodes 403a(2), 403b(2), . . . , and 403e(2) and the sizes of the second guard electrodes 1002(2) and 1002(3). In the case of not using the second guard electrodes 1002(2) and 1002(3), the size of the second applying electrode 1002(1) may be equal to the sum of the sizes of the second detecting electrodes 403a(2), 403b(2), . . . and 403e(2).

In this case, the second applying electrode 1002(1) and the second detecting electrodes 403a(2), 403b(2), . . . , and 403e(2) respectively constitute a capacitor, and are provided with predetermined electrostatic capacitance.

The second detecting electrodes 403a(2), 403b(2), . . . , and 403e(2) lie between the second guard electrode 1002(2) and the second guard electrode 1002(3). Moreover, the second guard electrode 1002(2) and the second guard electrode 1002(3) are coupled to the same electric potential as that of the second detecting electrodes (for example, 0V).

The phenomenon in which the electric lines of force spread beyond the counter electrodes may be prevented from occurring in the same way as in the first sensor 1001, which does so by having the second guard electrodes 1002(2) and 1002(3). As a result, the electric lines of force can be prevented from spreading between the counter electrodes, and thus response signals that do not depend on the position of the piece of paper 304 between the counter electrodes can be obtained.

In the above described embodiments and the first modification, the cases of using two sensor arrays (the first sensor array 401 and the second sensor array 403) or sensors (the first sensor 1001 and the second sensor 1002) are described as examples, but only one sensor array may also be used. Such an exemplary configuration will be described.

Figure 11:
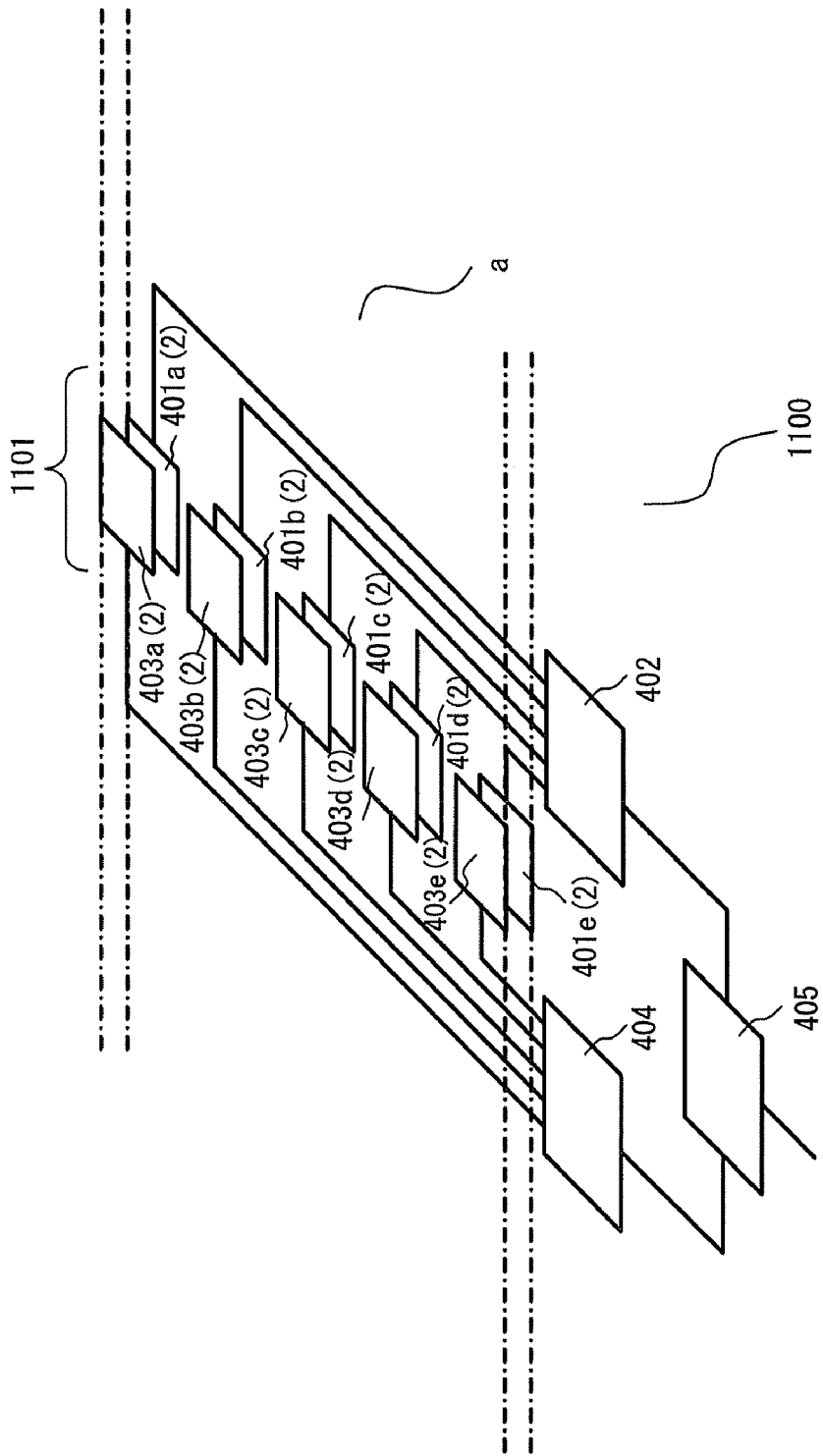
FIG. 11 is a diagram illustrating the second modification of a paper thickness detecting apparatus according to an embodiment of the present invention.

FIG. 11 is a diagram illustrating the second modification of the paper thickness detecting apparatus 300 according to the embodiments of the present invention.

A paper thickness detecting apparatus 1100 of FIG. 11 includes a sensor array 1101 for detecting the change in electrostatic capacitance, a first electric current detection circuit 402 for detecting first response signals, a second electric current detection circuit 404 for detecting second response signals, and a thickness detecting unit 405 for detecting the thickness of the piece of paper 304 from the first and second response signals.

The sensor array 1101 includes the first detecting electrodes 401a(2), 401b(2), . . . , and 401e(2), and the second detecting electrodes 403a(2), 403b(2), . . . , and 403e(2)

Moreover, the first detecting electrode 401a(2) and the second detecting electrode 403a(2), the first detecting electrode 401b(2) and the second detecting electrode 403b(2), . . . , and the first detecting electrode 401e(2) and the second detecting electrode 403e(2) respectively constitute a capacitor, and are provided with a predetermined electrostatic capacitance.

Here, assuming that the second detecting electrodes 403a(2), 403b(2), . . . , and 403e(2) are the first applying electrodes 401a(1), 401b(1), . . . , and 401e(1), the configuration becomes equal to the first sensor array 401 of FIG. 4.

Moreover, assuming that the first detecting electrodes 401a(2), 401b(2), . . . , and 401e(2) are the second applying electrodes 403a(1), 403b(1), . . . , and 403e(1), the configuration becomes equal to the second sensor array 403 of FIG. 4.

Accordingly, the first response signals and the second response signals can be obtained by alternately applying an input signal to the second sensor array and the first sensor array for a certain interval, and by alternately obtaining response signals from the first detecting electrodes and the second detecting electrodes.

As described in the above, the paper thickness detecting apparatus 300 obtains the first response signals from the first sensor array 401, and obtains the second response signals from the second sensor array 403. Then, the first response signals and the second response signals are compared with each other.

Here, the first sensor array 401 and the second sensor array 403 are arranged such that the first applying electrodes of the first sensor array 401 and the second applying electrodes of the second sensor array 403 are placed on opposite sides of the conveyance path a. Accordingly, if a common input signal is provided to both sensor arrays, the direction of electric lines of force for the piece of paper 304 passing through the first sensor array 401 becomes opposite to the direction of electric lines of force for the piece of paper 304 passing through the second sensor array 403.

When there are folds on the piece of paper 304, the electrostatic capacitance of the capacitors changes depending on the direction of the electric lines of force towards the piece of paper 304, and thereby the first response signals and the second response signals will be different from each other.

Accordingly, by comparing the first response signals with the second response signals, the change in the signals due to folds on the piece of paper 304 can be removed, and the change in the signals due to a foreign object such as a piece of tape adhered to the piece of paper 304 can be extracted.

As a result, it is possible to determine whether or not a foreign object such as a piece of tape is adhered to the piece of paper 304. For the same reason, the same effect can be obtained for the first modification or the second modification, as in the detection apparatus 300.

What is claimed is:

1. A paper thickness detecting apparatus for detecting a thickness of a piece of paper conveyed through a conveyance path from a change in electrostatic capacitance of a sensor having opposing electrodes, the sensor being arranged such that the conveyance path of the paper passes between the electrodes, the paper thickness detecting apparatus comprising:

a first sensor including a first applying electrode and a first detecting electrode that are arranged on opposite sides of the conveyance path, the first sensor being coupled to a first electric current detection circuit for detecting electric current in the first detecting electrode;

a second sensor including a second applying electrode and a second detecting electrode that are arranged on opposite sides of the conveyance path, the second sensor being coupled to a second electric current detection circuit for detecting electric current in the second detecting electrode, the first applying electrode and the second applying electrode being arranged on opposite sides of the conveyance path; and a thickness detecting unit configured to obtain a first response signal detected by the first electric current detection circuit of the first sensor and a second response signal detected by the second electric current detection circuit of the second sensor, and to detect a change in the thickness of the paper due to a foreign object from a result of comparing the first response signal with the second response signal.

2. The paper thickness detecting apparatus according to claim 1, wherein the first detecting electrode of the first sensor and the second detecting electrode of the second sensor each comprise a plurality of electrodes.

3. The paper thickness detecting apparatus according to claim 1, wherein the first applying electrode of the first sensor and the second applying electrode of the second sensor each comprise a single electrode.

4. The paper thickness detecting apparatus according to claim 1, wherein the thickness detecting unit compares a portion of the first response signal exceeding a predetermined level with a portion of the second response signal exceeding the predetermined level, and determines that a foreign object is adhered to the paper when the portions match each other or approximately match each other as a result of the comparing.

5. The paper thickness detecting apparatus according to claim 1, wherein the thickness detecting unit compares a portion of the first response signal exceeding a predetermined level with a portion of the second response signal exceeding the predetermined level, and determines that there is a fold on the paper when the portions do not match each other or do not approximately match each other as a result of the comparing.

* * * * *